(12) United States Patent
Yamazaki

(10) Patent No.: US 12,033,242 B2
(45) Date of Patent: Jul. 9, 2024

(54) OBSERVATION SYSTEM AND OBSERVATION SUPPORT METHOD

(71) Applicant: Evident Corporation, Nagano (JP)

(72) Inventor: Kentaro Yamazaki, Tokyo (JP)

(73) Assignee: Evident Corporation, Nagano (JP)

( * ) Notice: Subject to any disclaimer, the term of this patent is extended or adjusted under 35 U.S.C. 154(b) by 157 days.

(21) Appl. No.: 17/724,688

(22) Filed: Apr. 20, 2022

(65) Prior Publication Data

US 2022/0343560 A1 Oct. 27, 2022

(30) Foreign Application Priority Data

Apr. 23, 2021 (JP) ................. 2021-073573

(51) Int. Cl.
| | |
|---|---|
| *G09G 5/00* | (2006.01) |
| *G01S 11/12* | (2006.01) |
| *G01S 11/14* | (2006.01) |
| *G02B 25/00* | (2006.01) |
| *G06T 11/00* | (2006.01) |
| *G06V 40/18* | (2022.01) |

(52) U.S. Cl.
CPC ............... *G06T 11/00* (2013.01); *G01S 11/12* (2013.01); *G01S 11/14* (2013.01); *G02B 25/001* (2013.01); *G06V 40/18* (2022.01)

(58) Field of Classification Search
CPC ....... G06T 19/00; G06T 19/006; G06T 17/00; G06T 11/00; H04N 5/272; A63F 13/10; G01S 11/12; G01S 11/14; G02B 25/001; G06V 40/18
USPC ......................................................... 345/632
See application file for complete search history.

(56) References Cited

U.S. PATENT DOCUMENTS

| | | | |
|---|---|---|---|
| 2020/0310540 A1* | 10/2020 | Hussami | ................. G06N 20/00 |
| 2022/0350146 A1* | 11/2022 | Hua | .................... G02B 27/1066 |
| 2023/0105799 A1* | 4/2023 | Nishide | ................... G16H 30/40 |
| | | | 382/131 |

FOREIGN PATENT DOCUMENTS

WO 2018231204 A1 12/2018

* cited by examiner

*Primary Examiner* — Gordon G Liu
(74) *Attorney, Agent, or Firm* — Holtz, Holtz & Volek PC

(57) ABSTRACT

An observation system includes: an observation device that includes an eyepiece lens and an objective and forms a real image of a sample on an optical path between the eyepiece lens and the objective; and an observation auxiliary device that is worn by a user and outputs auxiliary information to the user, the observation auxiliary device superimposing the auxiliary information on a virtual image of the sample to be observed by the user through the eyepiece lens on the basis of a relative position of the observation auxiliary device with respect to the observation device.

21 Claims, 23 Drawing Sheets

OBSERVATION SYSTEM AND
OBSERVATION SUPPORT METHOD

CROSS REFERENCE TO RELATED APPLICATIONS

This application is based upon and claims the benefit of priority from prior Japanese Patent Application No. 2021-073573, filed Apr. 23, 2021, the entire contents of which are incorporated herein by this reference.

TECHNICAL FIELD

The disclosure of the present specification relates to an observation system and an observation support method.

BACKGROUND

In pathological diagnosis, a technique for assisting diagnosis of a pathologist by displaying an image in which auxiliary information based on an image analysis result is superimposed on a digital image of a sample by a display device is known. The technique for displaying such auxiliary information is applicable not only to pathological diagnosis but also to various fields, and it is expected that use of the technique will be further expanded with development of an image analysis technology.

On the other hand, there is still a need to view an optical image of a sample by looking into an eyepiece lens. This is because digital images are generally inferior to optical images in color reproducibility and dynamic range.

A technique related to such a problem is described in, for example, WO 2018/231204 A. The auxiliary information is superimposed and displayed on the optical image by using the technique described in WO 2018/231204 A, so that a user can obtain necessary support by the auxiliary information while observing the sample with the optical image.

SUMMARY

An observation system according to one aspect of the present invention includes: an observation device that includes an eyepiece lens and an objective and forms a real image of a sample on an optical path between the eyepiece lens and the objective; and an observation auxiliary device that is worn by a user and outputs auxiliary information to the user, the observation auxiliary device superimposing the auxiliary information on a virtual image of the sample to be observed by the user via the eyepiece lens on the basis of a relative position of the observation auxiliary device with respect to the observation device.

An observation support method according to an aspect of the present invention includes: by an observation device including an eyepiece lens and an objective, forming a real image of a sample on an optical path between the eyepiece lens and the objective; and by an observation auxiliary device worn by a user, outputting auxiliary information to the user and superimposing the auxiliary information on a virtual image of the sample to be observed by the user via the eyepiece lens on the basis of a relative position of the observation auxiliary device with respect to the observation device.

BRIEF DESCRIPTION OF DRAWINGS

The present invention will be more apparent from the following detailed description when the accompanying drawings are referenced.

DESCRIPTION OF EMBODIMENTS

In order to use the technique described in WO 2018/231204 A, a projection device needs to be incorporated in an existing observation device. It is therefore necessary to significantly change a configuration of the existing observation device.

Considering such circumstances, an embodiment of the present invention will be described hereinafter.

First embodiment

Figure 1:
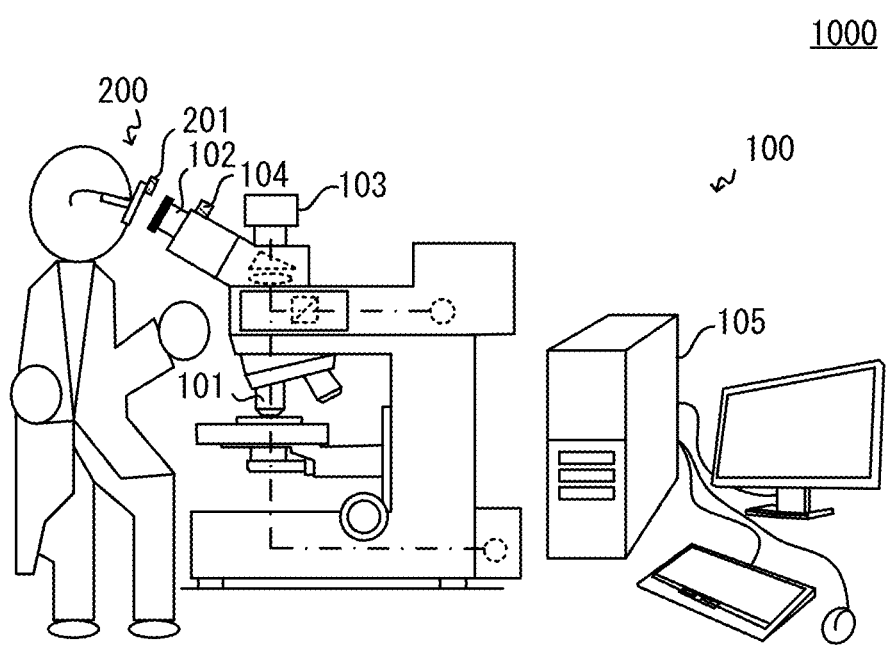
FIG. 1 is a diagram for explaining a configuration of a system 1000 according to a first embodiment.
Figure 2:
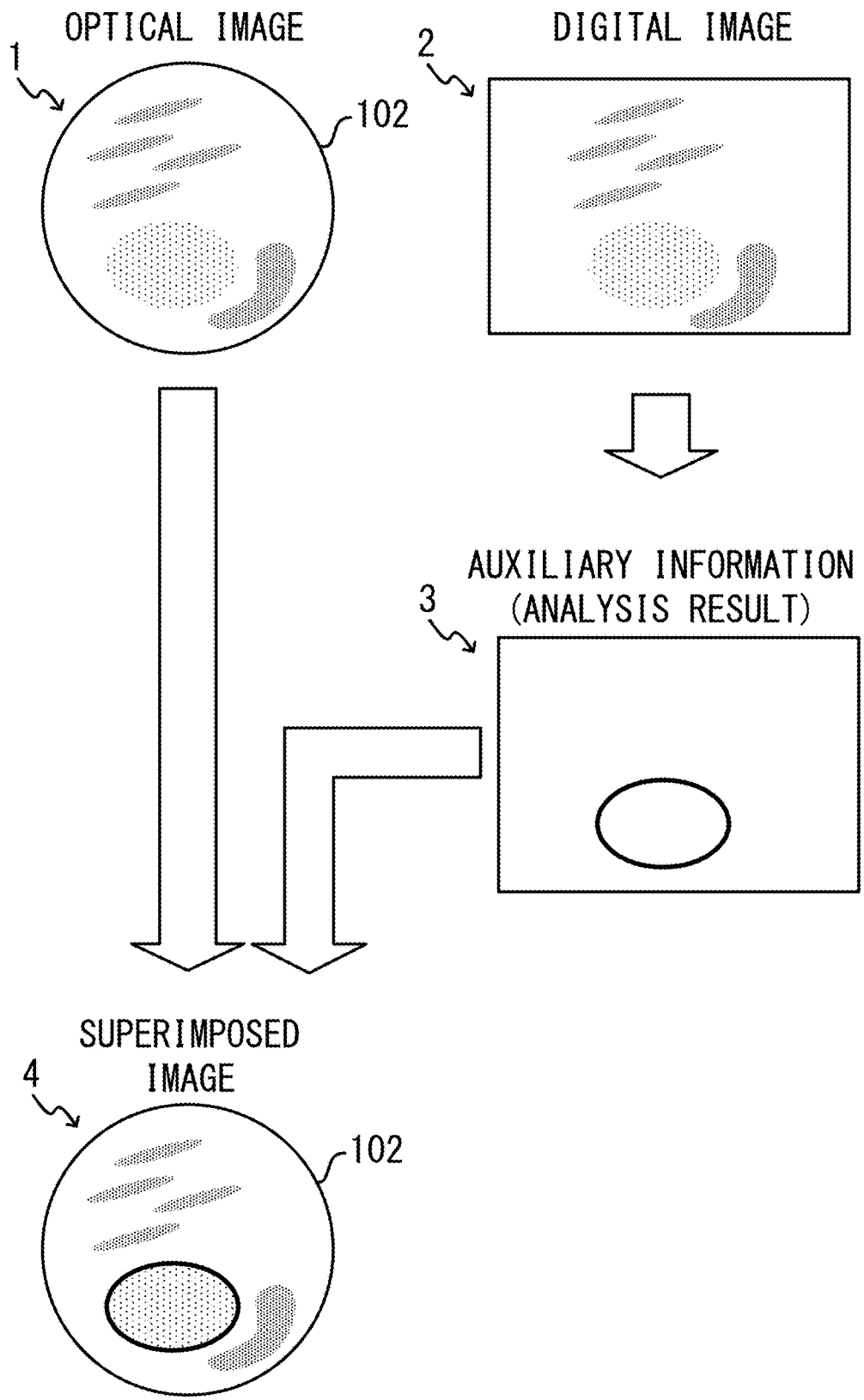
FIG. 2 is a diagram for explaining a configuration of a superimposed image to be provided to a user.

FIG. 1 is a diagram for explaining a configuration of a system 1000 according to the present embodiment. FIG. 2 is a diagram for explaining a configuration of a superimposed image to be provided to a user. Hereinafter, the configuration of the system 1000 will be described with reference to FIG. 1 and FIG. 2.

As illustrated in FIG. 1, the system 1000 includes an observation device 100 and an observation auxiliary device 200 capable of communicating with the observation device 100. Hereinafter, a case where communication between the observation device 100 and the observation auxiliary device 200 is achieved by wireless communication will be described as an example, but the communication between the observation device 100 and the observation auxiliary device 200 may be achieved by wired communication.

The observation device 100 is, for example, a microscope device. The observation device 100 includes an objective 101 and an eyepiece lens 102. The observation device 100 forms an optical image (real image) of a sample on an optical path between the objective 101 and the eyepiece lens 102. As illustrated in FIG. 2, the user of the observation device 100 observes, through the eyepiece lens 102, an optical image 1 (virtual image) obtained by magnifying the optical image (real image) formed by the observation device 100.

In addition, the observation device 100 may include a digital camera 103. The observation device 100 may branch into an optical path that guides light from the objective 101 to the eyepiece lens 102 and an optical path that guides the light to the digital camera 103 by a trinocular tube. A digital image 2 acquired by the digital camera 103 is output to, for example, a control device 105 that controls a microscope main body.

In the observation device 100, the control device 105 may generate auxiliary information 3 on the basis of a result of image analysis performed on the digital image 2. The auxiliary information 3 may be information for displaying an outline of a specific target (for example, cells, cell nuclei, etc.) included in the sample as illustrated in FIG. 2 and may be generated on the basis of, for example, an object detection result performed on the digital image 2.

The observation device 100 may further include a transmitter 104 for position detection. The transmitter 104 may be used to detect a relative position of the observation auxiliary device 200 with respect to the observation device 100 by being used in combination with a receiver 201 which will be described later. Hereinafter, the relative position of the observation auxiliary device 200 with respect to the observation device 100 will be simply referred to as a relative position. In order to grasp how far the user's eyes are from the eye point, the transmitter 104 is preferably provided at the eyepiece lens 102 or near the eyepiece lens 102 as illustrated in FIG. 1. Note that the transmitter 104 preferably transmits a signal that is not perceived by the user, and for example, preferably transmits at least one of an electromagnetic wave outside a visible range or an ultrasonic wave. The transmitter 104 may be a magnetic field generator that generates a magnetic field.

The observation auxiliary device 200 is, for example, smart glasses. The observation auxiliary device 200 is a wearable device worn by the user of the observation device 100 and outputs auxiliary information to the user when the user uses the observation device 100. The observation auxiliary device 200 only requires to output the auxiliary information in a mode that allows the user to visually recognize the auxiliary information. More specifically, the observation auxiliary device 200 only requires to output the auxiliary information in such a manner that the user can visually recognize the auxiliary information while observing the optical image of the sample through the eyepiece lens 102.

Thus, the observation auxiliary device 200 is not limited to the smart glasses and may include, for example, a see-through type head mounted display, may include a contact lens type device (smart contact lens) directly attached to the eyeball, or may include at least one of these. Note that a method of outputting the auxiliary information to the user is not particularly limited. The observation auxiliary device 200 may include, for example, a device using at least one of a retinal projection method, a retinal scanning method, a hologram method, or a micro LED method and may output the auxiliary information to the user using each method.

As illustrated in FIG. 2, the observation auxiliary device 200 superimposes the auxiliary information 3 on an optical image 1 (virtual image) to be observed by the user through the eyepiece lens 102 on the basis of the relative position. As a result, the user observes a superimposed image 4 in which the auxiliary information 3 is superimposed on the optical image 1. By arranging the auxiliary information 3 at an appropriate position of the optical image 1 using the relative position, the user can obtain appropriate information from the auxiliary information 3 included in the superimposed image 4.

The observation auxiliary device 200 may include the receiver 201 for position detection. The receiver 201 may be used to detect the relative position by being used in combination with the transmitter 104 described above. The method of position detection by the transmitter 104 and the receiver 201 is not particularly limited. For example, three or more transmitters 104 may be provided in the observation device 100, and three-point positioning in which positioning is performed by signals from the transmitters 104 may be used as a positioning method. In addition, three or more receivers 201 may be provided in the observation auxiliary device 200, and three-point positioning in which positioning is performed by signals received by the receivers 201 may be used as a positioning method. The observation device 100 and the observation auxiliary device 200 may detect the relative position by three-point positioning.

Figure 3:
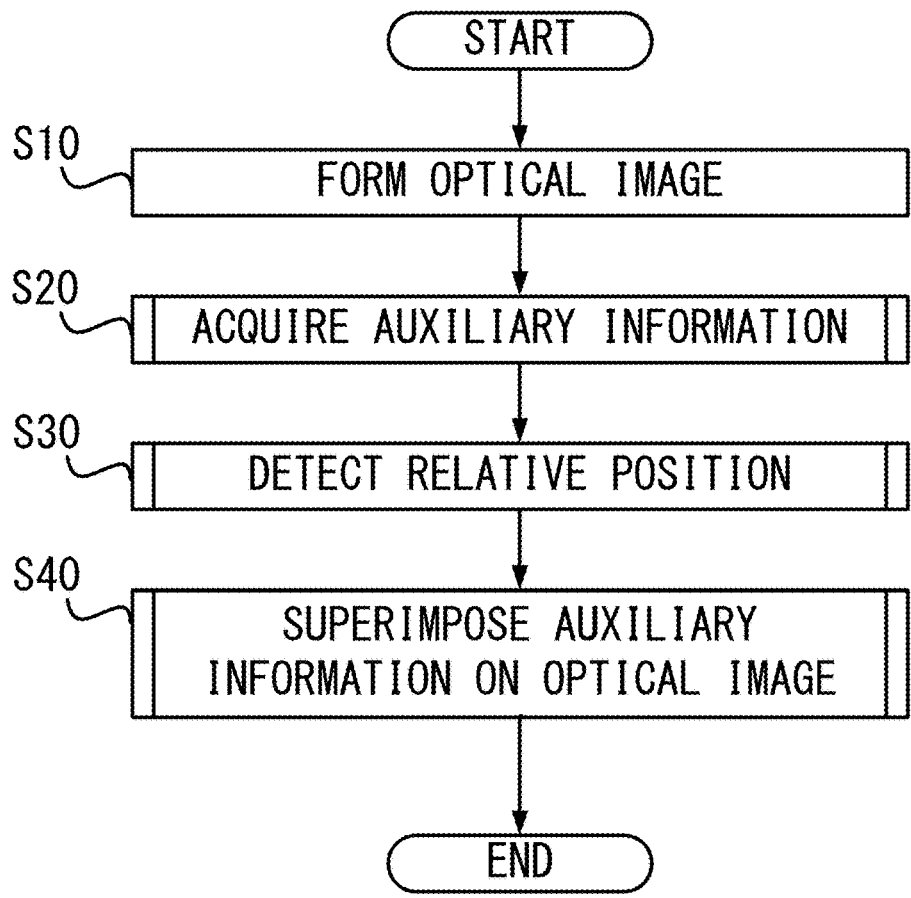
FIG. 3 is a flowchart illustrating an example of processing to be performed by the system 1000.
Figure 4:
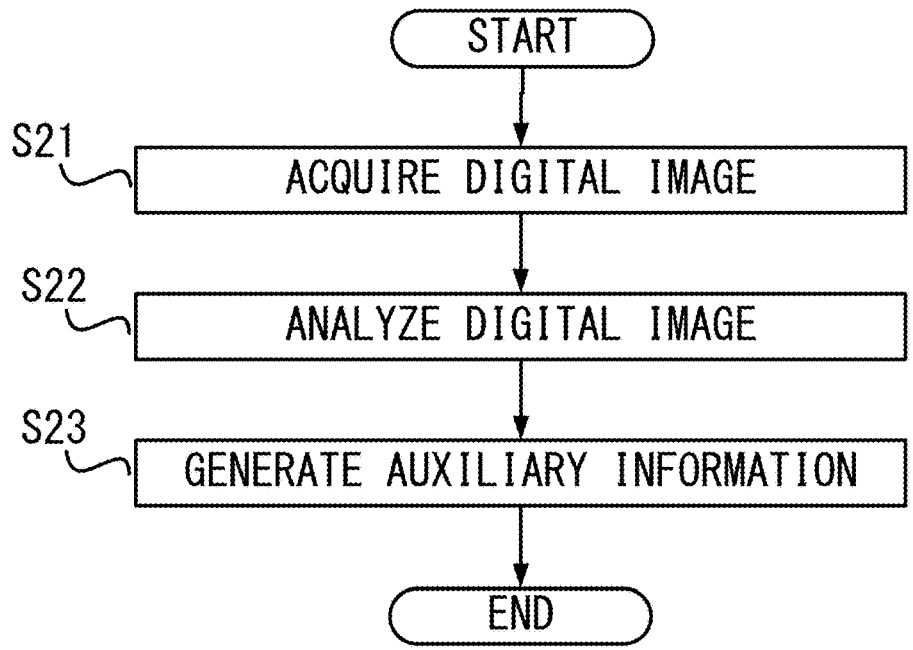
FIG. 4 is a flowchart illustrating an example of auxiliary information acquisition processing to be performed by the system 1000.
Figure 5:
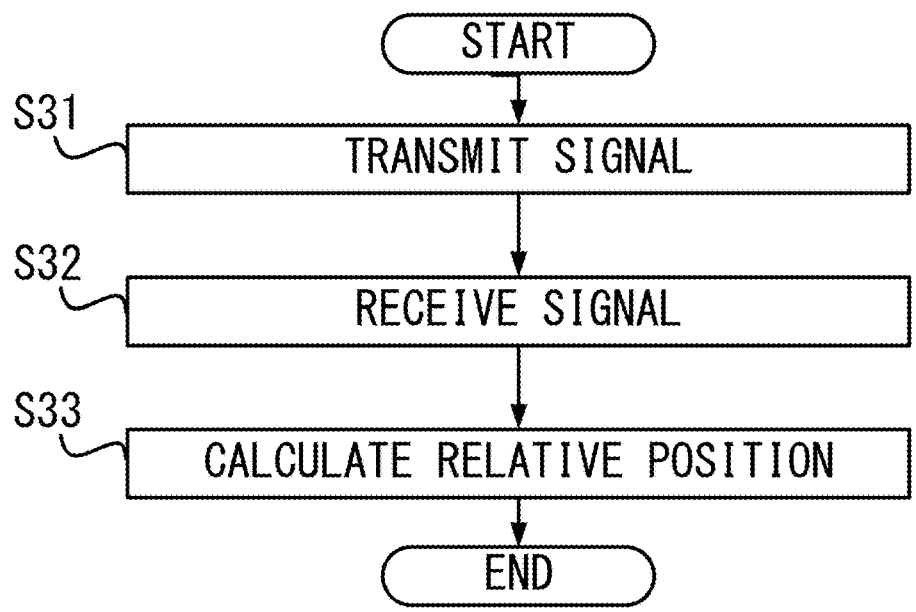
FIG. 5 is a flowchart illustrating an example of relative position detection processing to be performed by the system 1000.
Figure 6:
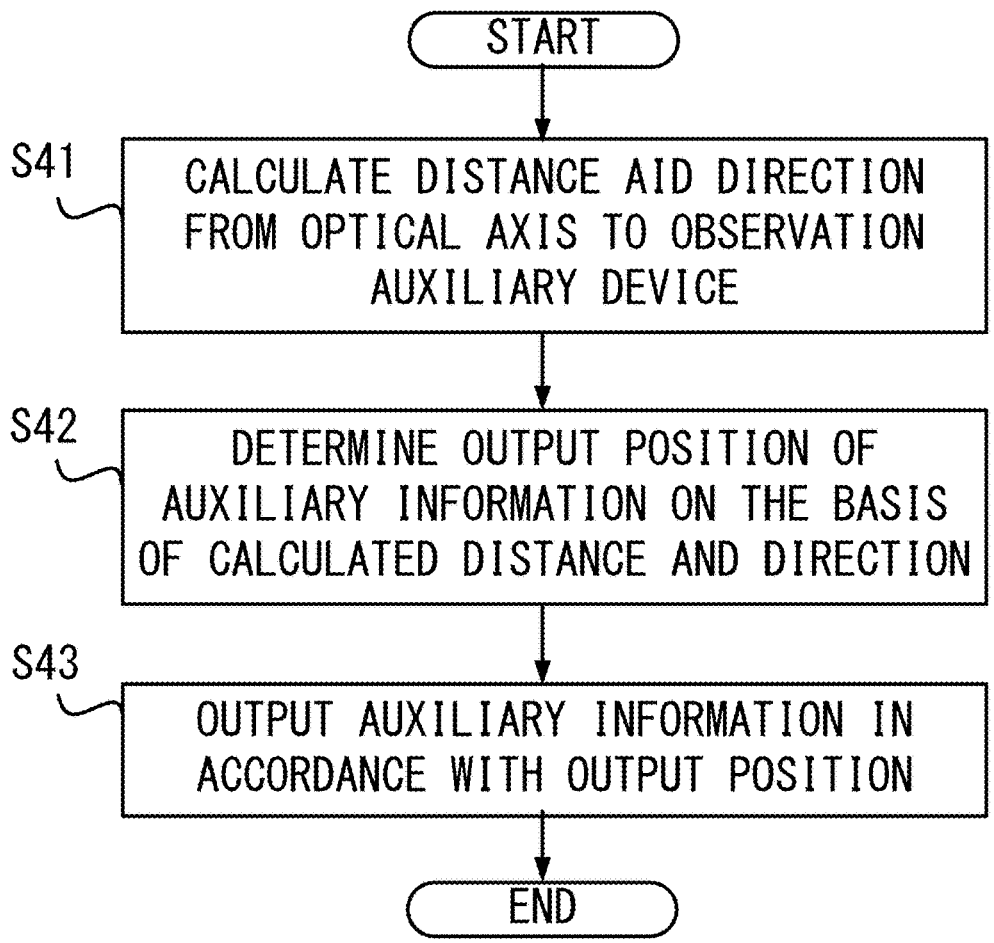
FIG. 6 is a flowchart illustrating an example of auxiliary information output processing to be performed by the system 1000.
Figure 7:
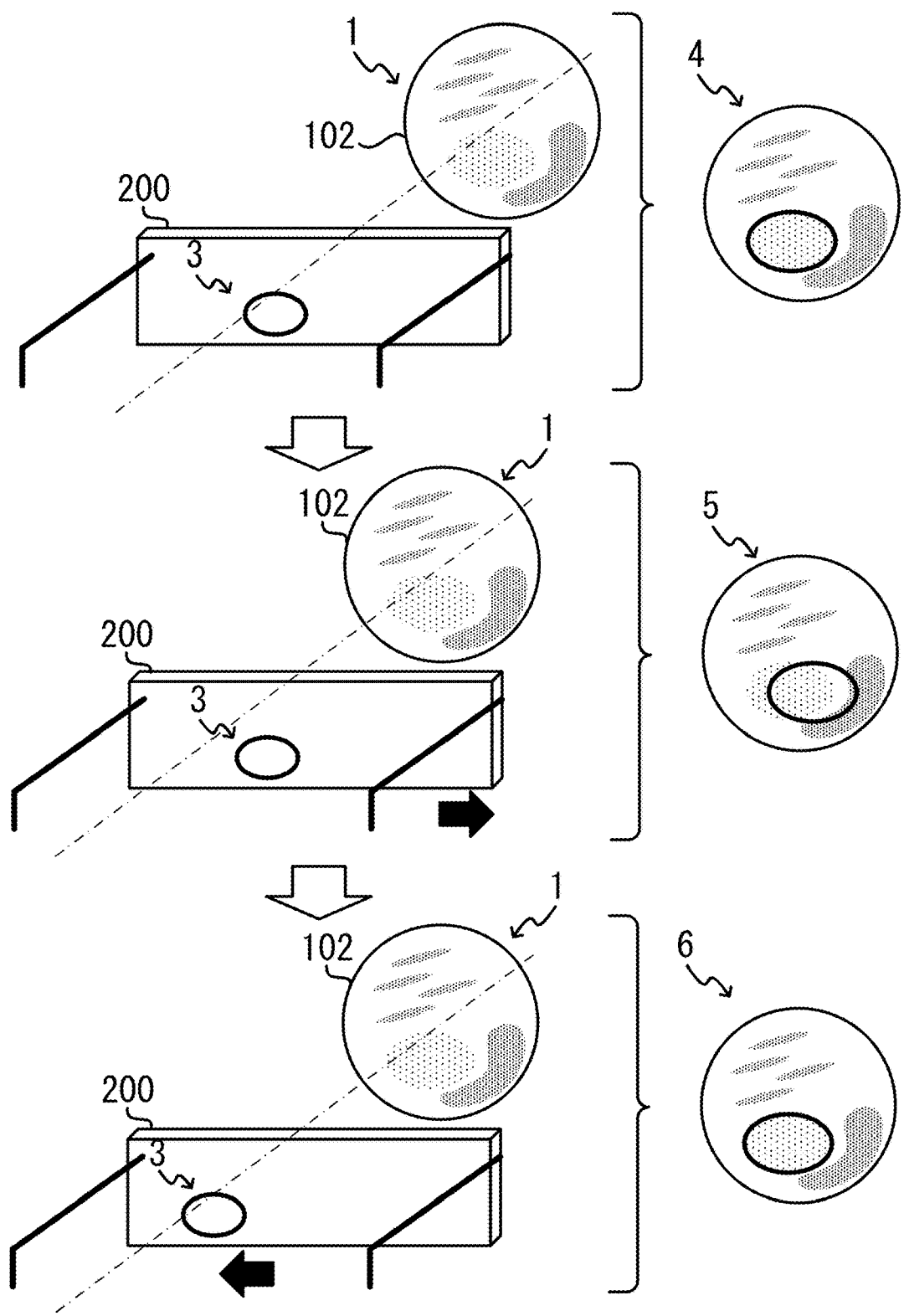
FIG. 7 is a diagram illustrating an adjustment example of an output position of auxiliary information 3 by the auxiliary information output processing illustrated in FIG. 6.

FIG. 3 is a flowchart illustrating an example of processing to be performed by the system 1000. FIG. 4 is a flowchart illustrating an example of auxiliary information acquisition processing to be performed by the system 1000. FIG. 5 is a flowchart illustrating an example of relative position detection processing to be performed by the system 1000. FIG. 6 is a flowchart illustrating an example of auxiliary information output processing to be performed by the system 1000. FIG. 7 is a diagram illustrating an adjustment example of an output position of the auxiliary information 3 by the auxiliary information output processing illustrated in FIG. 6. An observation support method to be performed by the system 1000 will be described with reference to FIGS. 3 to 7.

When the system 1000 starts the processing illustrated in FIG. 3, the observation device 100 forms an optical image of the sample placed on a stage (step S10). Here, the observation devices 100 collects light from the sample by the objective 101 and a tube lens (not illustrated) to form an optical image of the sample. The optical image is formed, for example, on each of the optical paths branching in the trinocular tube and leading to the eyepiece lens 102 and an imaging surface of the digital camera 103. The optical image formed on the optical path to the eyepiece lens 102 is observed by the user through the eyepiece lens 102.

In addition, the system 1000 acquires auxiliary information (step S20). For example, the system 1000 may acquire the auxiliary information by performing the auxiliary information acquisition processing illustrated in FIG. 4. When the processing illustrated in FIG. 4 is started, the observation device 100 acquires a digital image (step S21). In step S21, the digital camera 103 converts the optical image formed on the imaging surface into a digital image and outputs the digital image to the control device 105, so that the observation device 100 acquires the digital image. Next, the observation device 100 analyzes the digital image (step S22). In step S22, for example, the control device 105 performs object detection on the digital image to detect a position of a predetermined object in the digital image. Finally, the observation device 100 generates auxiliary information (step S23). In step S23, the control device 105 generates auxiliary information that draws an outline of the predetermined object on the basis of position information of the predetermined object detected by the object detection, for example. The generated auxiliary information is transmitted from the observation device 100 to the observation auxiliary device 200.

Note that, while FIG. 4 illustrates an example where the observation device 100 generates the auxiliary information and the observation auxiliary device 200 acquires the auxiliary information from the observation device 100 as an example of the auxiliary information acquisition processing, the auxiliary information may be generated by the observation auxiliary device 200. The observation auxiliary device 200 may acquire information (for example, a digital image) different from the auxiliary information from the observation device 100 and generate the auxiliary information on the basis of the acquired information.

In addition, the system 1000 detects the relative position (step S30). For example, the system 1000 may detect the relative position by performing the relative position detection processing illustrated in FIG. 5. In the processing illustrated in FIG. 5, the observation device 100 transmits a signal (step S31), and the observation auxiliary device 200 receives the signal (step S32). More specifically, the transmitter 104 transmits a signal for position detection (hereinafter, referred to as a position signal), and the receiver 201 receives the position signal. Thereafter, the observation auxiliary device 200 calculates the relative position on the basis of the position signal detected by the receiver 201 (step S33). The relative position can be calculated using any known method.

Note that while in FIG. 5 an example has been described as an example of the relative position detection processing, where the observation auxiliary device 200 receives the signal transmitted by the observation device 100 and the observation auxiliary device 200 calculates the relative position, the relative position may be calculated by the observation device 100. For example, a transmitter may be provided in the observation auxiliary device 200, a receiver may be provided in the observation device 100, and the observation device 100 may calculate the relative position on the basis of the signal received from the observation auxiliary device 200. In this case, the calculated information on the relative position is transmitted from the observation device 100 to the observation auxiliary device 200.

When the processing from step S10 to step S30 ends, the system 1000 outputs the auxiliary information and superimposes the auxiliary information on the optical image (step S40). Note that the order of the processing from step S10 to step S30 is not limited to this example. The processing from step S10 to step S30 only requires to be performed before the processing of step S40. The processing from step S10 to step S30 may be performed in order different from the order of the processing illustrated in FIG. 3, or one or more pieces of processing may be performed temporally in parallel.

In step S40, the system 1000 may superimpose the auxiliary information on the optical image, for example, by performing the auxiliary information output processing illustrated in FIG. 6. In the processing illustrated in FIG. 6, the observation auxiliary device 200 calculates a distance and a direction from an optical axis of the eyepiece lens 102 to the observation auxiliary device 200 on the basis of the relative position calculated in step S33 (step S41) and determines the output position of the auxiliary information on the basis of the calculated distance and direction (step S42). This is because even if the auxiliary information is output from a certain position of the observation auxiliary device 200, the position of the auxiliary information with respect to the optical image to be observed by the user through the eyepiece lens 102 changes depending on the distance and the direction from the optical axis of the eyepiece lens 102 to the observation auxiliary device 200.

Finally, the observation auxiliary device 200 outputs the auxiliary information acquired in step S23 in accordance with the output position determined in step S42 (step S43). As a result, the output position of the auxiliary information is appropriately changed on the basis of the distance and the direction calculated in step S41, so that the auxiliary information can be output to a position corresponding to the position of the observation auxiliary device 200 with respect to the optical axis of the eyepiece lens 102.

The system 1000 can display the auxiliary information 3 at an appropriate position on the optical image 1 by performing the processing illustrated in FIG. 3 described above. This point will be described with reference to FIG. 7. First, a case where the output position of the auxiliary information 3 from the observation auxiliary device 200 does not change will be considered. In this case, if the user wearing the observation auxiliary device 200 moves with respect to the eyepiece lens 102 while observing the superimposed image 4 in which the auxiliary information 3 is superimposed at the appropriate position on the optical image 1, the observation auxiliary device 200 also moves with respect to the eyepiece lens 102 together with the user, which results in moving the auxiliary information 3 with respect to the optical image 1. Thus, as illustrated in FIG. 7, the user observes the superimposed image 5 in which the auxiliary information 3 is superimposed at a position shifted from an appropriate position on the optical image 1. However, in the system 1000, the output position of the auxiliary information 3 from the observation auxiliary device 200 changes on the basis of the distance and the direction from the eyepiece lens 102, so that the shift occurring in the superimposed image 5 described above is eliminated. As a result, even in a case where the user moves with respect to the eyepiece lens 102, the user can observe the superimposed image 6 in which the auxiliary information 3 is superimposed at an appropriate position on the optical image 1 as illustrated in FIG. 7.

Furthermore, in the system 1000, the observation device 100 can be configured without making a significant change to the existing observation device. Specifically, the observation device 100 can be configured only by adding the transmitter 104 to an existing observation device, for example. Other necessary changes can be achieved by software processing to be performed by the control device 105.

Thus, according to the system 1000, it is possible to provide the user with the auxiliary information together with the optical image without significantly changing the configuration of the existing observation device. In particular, the auxiliary information can be superimposed and displayed at an appropriate position on the optical image, so that the user can correctly recognize the auxiliary information. In addition, it is possible to avoid increase in size of the device as compared with an existing device.

In addition, it is not necessary to significantly change the configuration of existing smart glasses for the observation auxiliary device 200. The observation auxiliary device 200 can be configured by, for example, only adding the receiver 201 to existing smart glasses. Other necessary changes can be achieved by software processing to be performed by a processor included in the observation auxiliary device 200.

Thus, according to the system 1000, existing smart glasses used for other applications can be used as the observation auxiliary device 200 included in the system 1000 with necessary modifications added. Thus, the user can use one pair of smart glasses in a plurality of systems including the system 1000, so that it is possible to avoid inconvenience such as having to replace the smart glasses in accordance with the system to be used.

Figure 8:
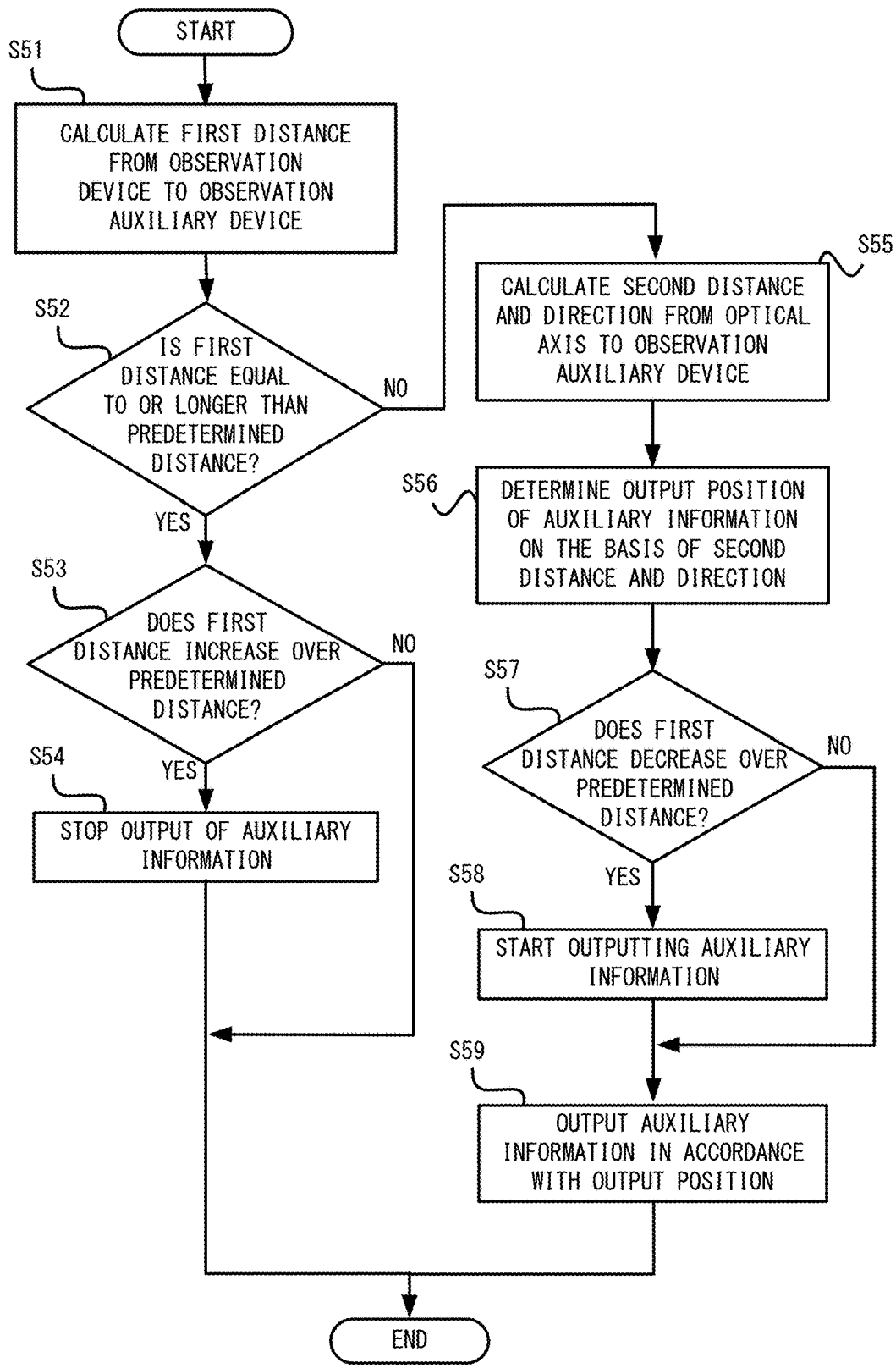
FIG. 8 is a flowchart illustrating another example of the auxiliary information output processing to be performed by the system 1000.
Figure 9:
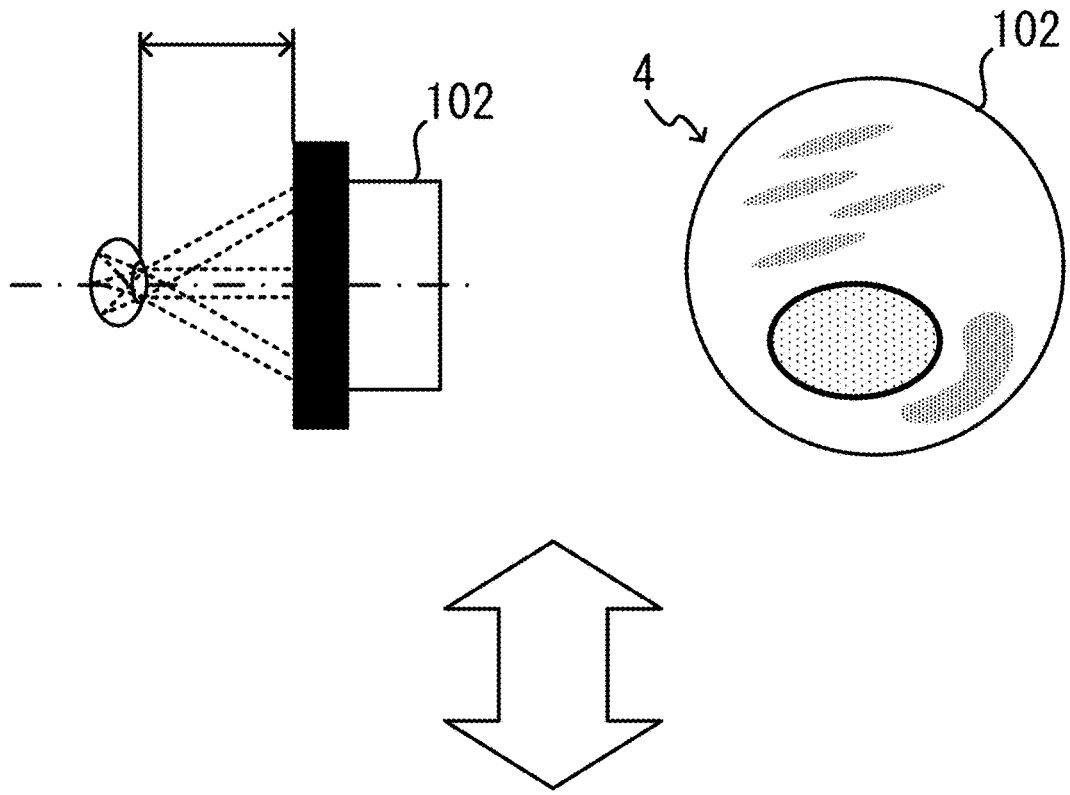
FIG. 9 is a diagram illustrating an adjustment example of an output position of auxiliary information 3 by the auxiliary information output processing illustrated in FIG. 8.
Figure 9:
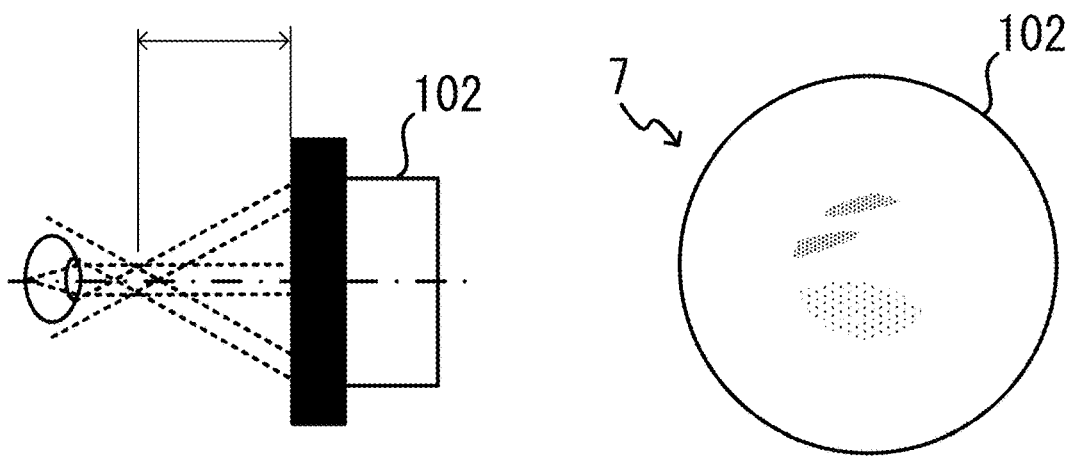

FIG. 8 is a flowchart illustrating another example of the auxiliary information output processing to be performed by the system 1000. FIG. 9 is a diagram illustrating an adjustment example of the output position of the auxiliary information 3 by the auxiliary information output processing illustrated in FIG. 8. The system 1000 may perform the auxiliary information output processing illustrated in FIG. 8 instead of the auxiliary information output processing illustrated in FIG. 6.

The observation auxiliary device 200 calculates a distance (hereinafter, referred to as a first distance) from the observation device 100 to the observation auxiliary device 200 on the basis of the relative position calculated in step S33 (step S51) and determines whether or not the calculated first distance is equal to or longer than a predetermined distance (step S52). The predetermined distance only requires to be a distance indicating that the user (observation auxiliary device 200) is away from the observation device 100 to such an extent that it can be determined that the user is not looking into the eyepiece lens 102. More specifically, the predetermined distance is determined in advance on the basis of, for example, an eye relief that is a distance from the eyepiece lens 102 to the eye point. In other words, in step S52, the observation auxiliary device 200 determines whether or not the distance from the eyepiece lens 102 to the user's eye (for example, the pupil) is sufficiently longer than the eye relief.

In a case where it is determined in step S52 that the first distance is equal to or longer than the predetermined distance (Step S52: Yes), the observation auxiliary device 200 further determines whether or not the first distance increases over the predetermined distance when compared with the first distance calculated last time (step S53). In a case where it is determined that the first distance increases over the predetermined distance (step S53: Yes), the observation auxiliary device 200 stops output of the auxiliary information 3 (step S54), and thereafter, ends the auxiliary information output processing illustrated in FIG. 8. On the other hand, in a case where it is determined that the first distance has not increased over the predetermined distance (step S53: No), the observation auxiliary device 200 skips step S54 and ends the auxiliary information output processing.

On the other hand, in a case where it is determined in step S52 that the first distance is not equal to or longer than the predetermined distance (step S52: No), the observation auxiliary device 200 calculates a distance (hereinafter, referred to as a second distance) and a direction from the optical axis of the eyepiece lens 102 to the observation auxiliary device 200 on the basis of the relative position calculated in step S33 (step S55) and determines an output position of the auxiliary information on the basis of the calculated second distance and direction (step S56). Note that the processing in step S55 and step S56 is similar to the processing in step S41 and step S42 in FIG. 6.

Thereafter, the observation auxiliary device 200 determines whether or not the first distance decreases over the predetermined distance when compared with the first distance calculated last time (step S57). In a case where it is determined that the first distance decreases over the predetermined distance (step S57: Yes), the observation auxiliary device 200 starts outputting the auxiliary information 3 (step S58), outputs the auxiliary information in accordance with the output position determined in step S56 (step S59) and then ends the auxiliary information output processing illustrated in FIG. 8. On the other hand, in a case where it is determined that the first distance has not decreased over the predetermined distance (step S57: No), the observation auxiliary device 200 outputs the auxiliary information in accordance with the output position determined in step S56 (step S59) without performing step S58 and then ends the auxiliary information output processing.

In the auxiliary information output processing illustrated in FIG. 8, the observation auxiliary device 200 stops output of the auxiliary information 3 on the basis of the distance from the observation device 100 to the observation auxiliary device 200 and starts outputting the auxiliary information 3 on the basis of the distance from the observation device 100 to the observation auxiliary device 200. More specifically, the observation auxiliary device 200 stops output of the auxiliary information 3 when the state changes from a state in which the observation auxiliary device 200 is located relatively close to the observation device 100 (for example, a state in which the user's eyes are located at the eye point) to a state in which the observation auxiliary device 200 is located relatively away from the observation device 100 (for example, a state in which the user's eyes are located away from the eye point) and thereafter, maintains stop of output until the state changes to the state in which the observation auxiliary device 200 is located relatively close to the observation device 100. In addition, the observation auxiliary device 200 starts outputting the auxiliary information 3 when the state changes from a state in which the observation auxiliary device 200 is located relatively away from the observation device 100 to a state in which the observation auxiliary device 200 is located relatively close to the observation device 100, and thereafter, continuously outputs the auxiliary information 3 until the state changes to the state in which the observation auxiliary device 200 is located relatively away from the observation device 100.

As a result, in a case where the user's eyes are located at the eye point, the auxiliary information 3 is output from the observation auxiliary device 200, so that, as illustrated in FIG. 9, the user can observe the superimposed image 4 in which the auxiliary information 3 is superimposed on the optical image 1. In addition, in a state where the user is not looking into the eyepiece lens 102, the user's eyes are away from the eye point, and thus, the auxiliary information 3 is not output from the observation auxiliary device 200, which can prevent the auxiliary information 3 from wastefully obstructing the view of the user. Further, even if the user is looking into the eyepiece lens 102 while the user's eyes are away from the eye point, the optical image 7 that can be observed through the eyepiece lens 102 is an incomplete image in which a periphery of a field of view is vignetted as illustrated in FIG. 9. Thus, no substantial adverse effect is provided even if the auxiliary information 3 is not output in a state where the user's eyes are away from the eye point.

Even in a case where the system 1000 performs the auxiliary information output processing illustrated in FIG. 8 instead of the auxiliary information output processing illustrated in FIG. 6, it is possible to obtain effects similar to those obtained in a case where the system 1000 performs the auxiliary information output processing illustrated in FIG. 6. In addition, by performing the auxiliary information output processing illustrated in FIG. 8, the auxiliary information 3 is not output from the observation auxiliary device 200 in a state where the observation auxiliary device 200 is away from the observation device 100, so that it is possible to avoid a situation where the auxiliary information 3 is displayed in a state where the user is not observing the sample with the observation device 100 and the field of view of the user is blocked. Furthermore, by performing the auxiliary information output processing illustrated in FIG. 8, output of the auxiliary information 3 is started only by the user approaching the observation device 100 and looking into the eyepiece lens 102. Thus, the auxiliary information 3 is automatically output only when the user observes the sample, so that it is possible to provide the auxiliary information 3 at a necessary timing without imposing a burden on the user.

Figure 10:
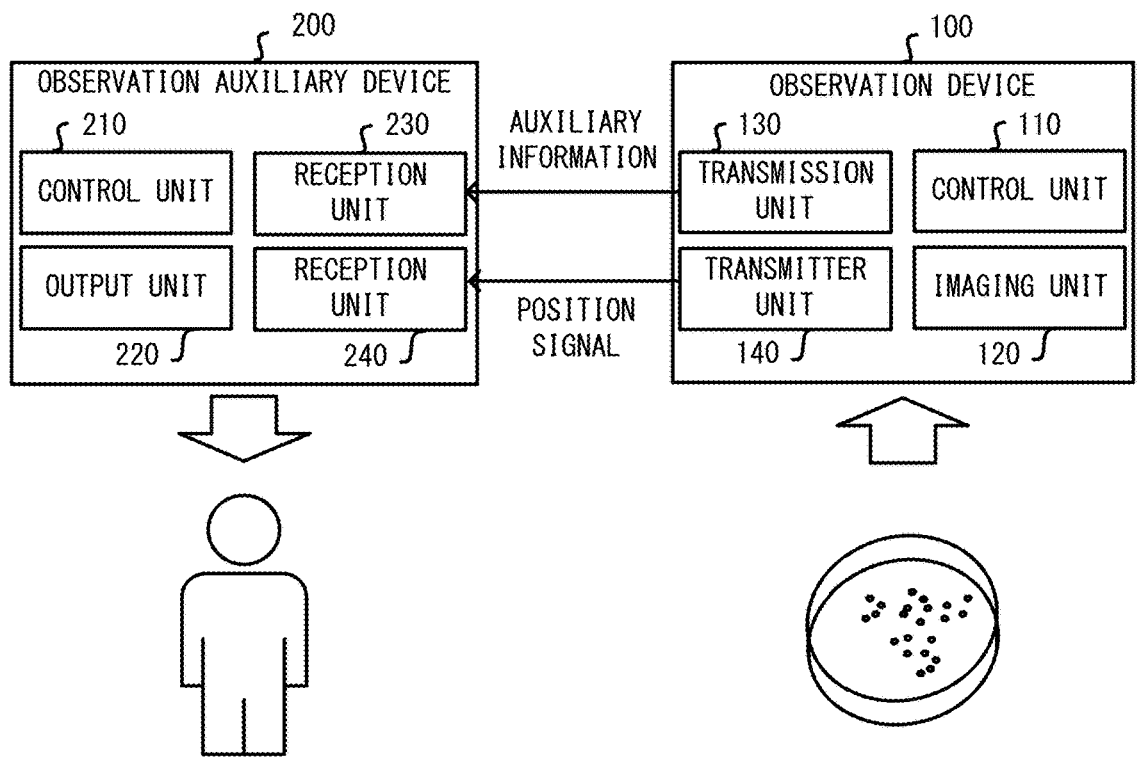
FIG. 10 is a diagram for explaining a functional configuration of the system 1000 according to the first embodiment.

FIG. 10 is a diagram for explaining a functional configuration of the system 1000 according to the present embodiment. Hereinafter, the function of the system 1000 will be described with reference to FIG. 10.

As illustrated in FIG. 10, the observation device 100 included in the system 1000 includes a control unit 110, an imaging unit 120, a transmission unit 130, and a transmitter unit 140. The control unit 110 includes, for example, the control device 105 illustrated in FIG. 1. The control unit 110 includes a processor and a memory and controls operation of the observation device 100. The imaging unit 120 includes, for example, the digital camera 103 illustrated in FIG. 1. The imaging unit 120 acquires a digital image of the sample and outputs the digital image to the control unit 110. The transmission unit 130 is, for example, a wireless communication device and transmits the auxiliary information to the observation auxiliary device 200. Note that the auxiliary information is generated by the control unit 110 by, for example, analyzing the digital image captured by the imaging unit 120, but does not necessarily have to be generated on the basis of the digital image. The transmitter unit 140 includes, for example, the transmitter 104. The transmitter unit 140 transmits a position signal for detecting the relative position.

As illustrated in FIG. 10, the observation auxiliary device 200 included in the system 1000 includes a control unit 210, an output unit 220, a reception unit 230, and a reception unit 240. The control unit 210 includes a processor and a memory and controls operation of the observation auxiliary device 200. The output unit 220 outputs the auxiliary information. The reception unit 230 is, for example, a wireless communication device and receives the auxiliary information from the observation device 100. The reception unit 240 includes, for example, the receiver 201. The reception unit 240 receives a position signal for detecting the relative position.

Figure 11:
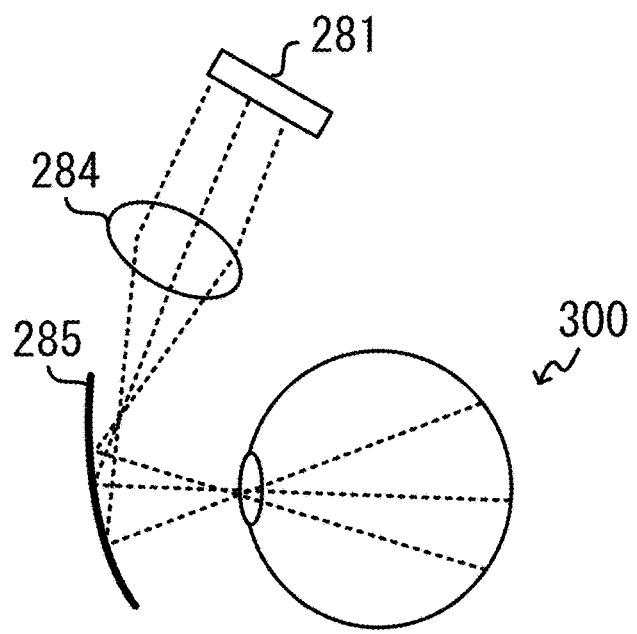
FIG. 11 is a diagram for explaining an example of a configuration of an output unit 220.
Figure 12:
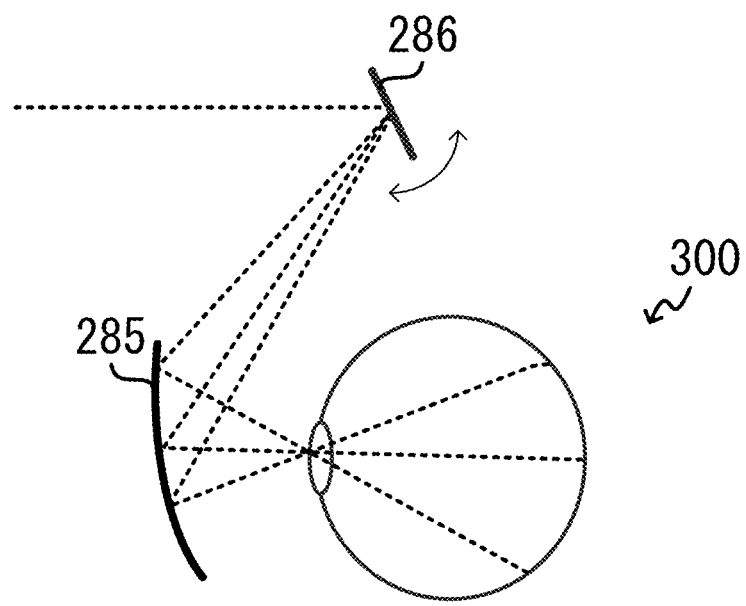
FIG. 12 is a diagram for explaining another example of the configuration of the output unit 220.
Figure 13:
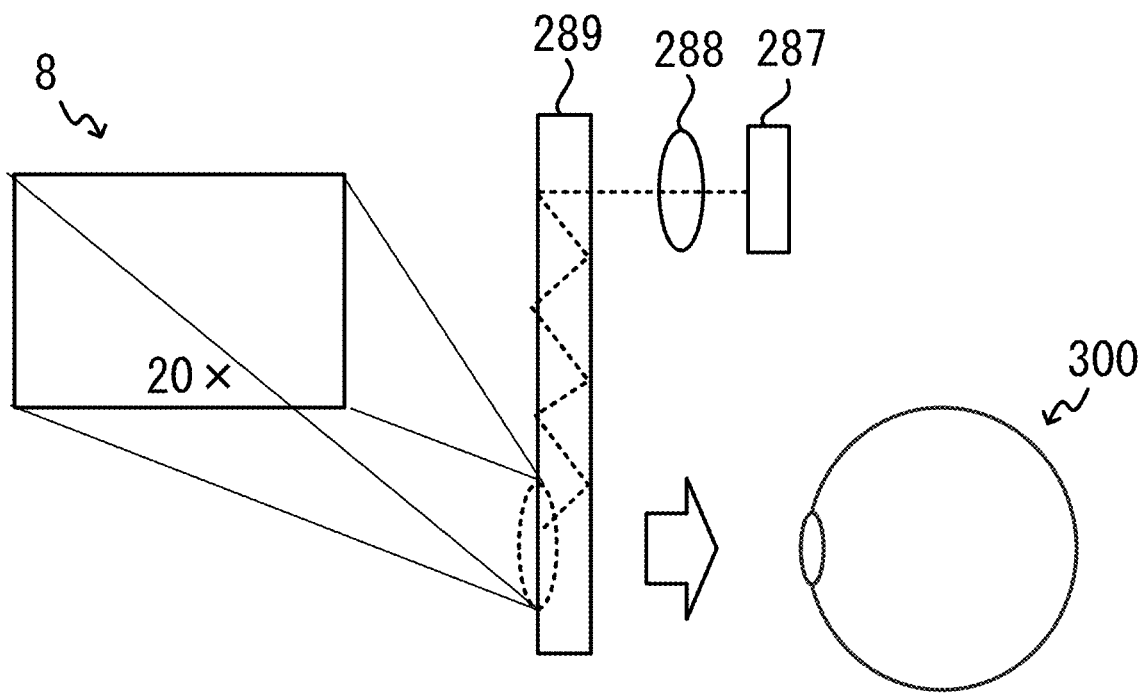
FIG. 13 is a diagram for explaining still another example of the configuration of the output unit 220.

FIGS. 11 to 13 are diagrams for explaining a configuration example of the output unit 220. In the example illustrated in FIG. 11, the output unit 220 includes a display element 281, a lens 284, and a concave mirror 285. The display element 281 is, for example, a liquid crystal display (LCD). Light from the display element 281 is incident on the eye 300 from the pupil through the lens 284 and the concave mirror 285, and an image of the display element 281 is projected on the retina. The device illustrated in FIG. 11 is an example of a device using a retinal projection method. The observation auxiliary device 200 may include the device using the retinal projection method.

In the example illustrated in FIG. 12, the output unit 220 includes a micro electro mechanical systems (MEMS) mirror 286 and a concave mirror 285. By controlling the MEMS mirror 286, the retina is scanned with light incident on the eye 300 from the pupil. The device illustrated in FIG. 12 is an example of a device using a retinal scanning method. The observation auxiliary device 200 may include the device using the retinal scanning method.

In the example illustrated in FIG. 13, the output unit 220 includes a display element 287, a lens 288, and a diffractive light guide element 289. The display element 287 is, for example, a liquid crystal display (LCD). Light from the display element 287 is incident on the diffractive light guide element 289 through the lens 288. The diffractive light guide element 289 includes, for example, a transparent flat plate and a diffractive optical element. The light incident on the diffractive light guide element 289 travels while being repeatedly diffracted and reflected to reach a diffractive optical element located in front of the eye 300, and thereby an image (auxiliary information 8) is reproduced. The device illustrated in FIG. 13 is an example of a device using a hologram method. The observation auxiliary device 200 may include the device using the hologram method.

Second Embodiment

Figure 14:
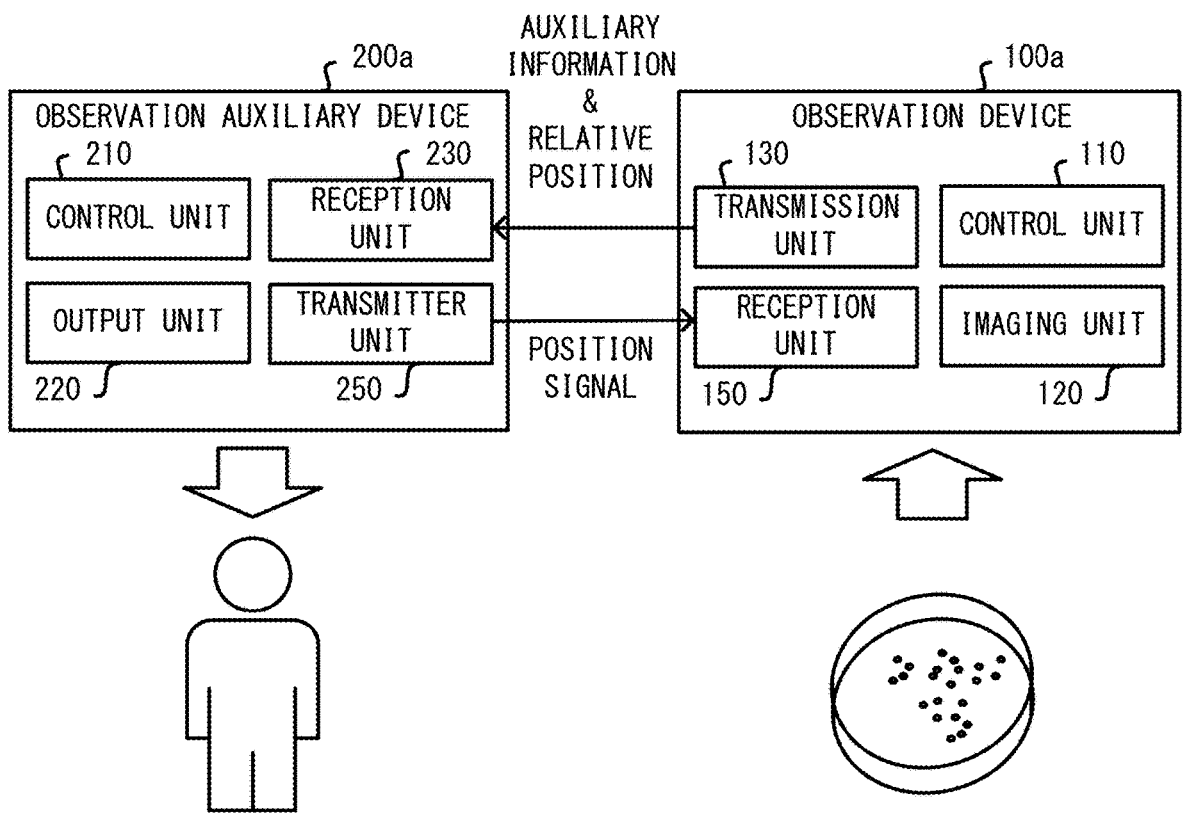
FIG. 14 is a diagram for explaining a functional configuration of a system according to a second embodiment.

FIG. 14 is a diagram for explaining a functional configuration of a system according to the present embodiment. As illustrated in FIG. 14, the system (hereinafter, simply referred to as the present system) according to the present embodiment includes an observation device 100a and an observation auxiliary device 200a capable of communicating with the observation device 100a.

The observation device 100a is different from the observation device 100 in that the observation device 100a includes a reception unit 150 instead of the transmitter unit 140. The observation auxiliary device 200a is different from the observation auxiliary device 200 in that the observation auxiliary device 200a includes a transmitter unit 250 instead of the reception unit 240.

In other words, the present system is different from the system 1000 in that the observation device 100a functions as a reception side of a position signal for detecting the relative position, and the observation auxiliary device 200a functions as a transmitter side. Furthermore, in the present system, the relative position is calculated by the observation device 100a, and thus, information regarding the relative position is also transmitted from the observation device 100a to the observation auxiliary device 200a together with the auxiliary information. Effects similar to those of the system 1000 can be obtained by the present system.

Third Embodiment

Figure 15:
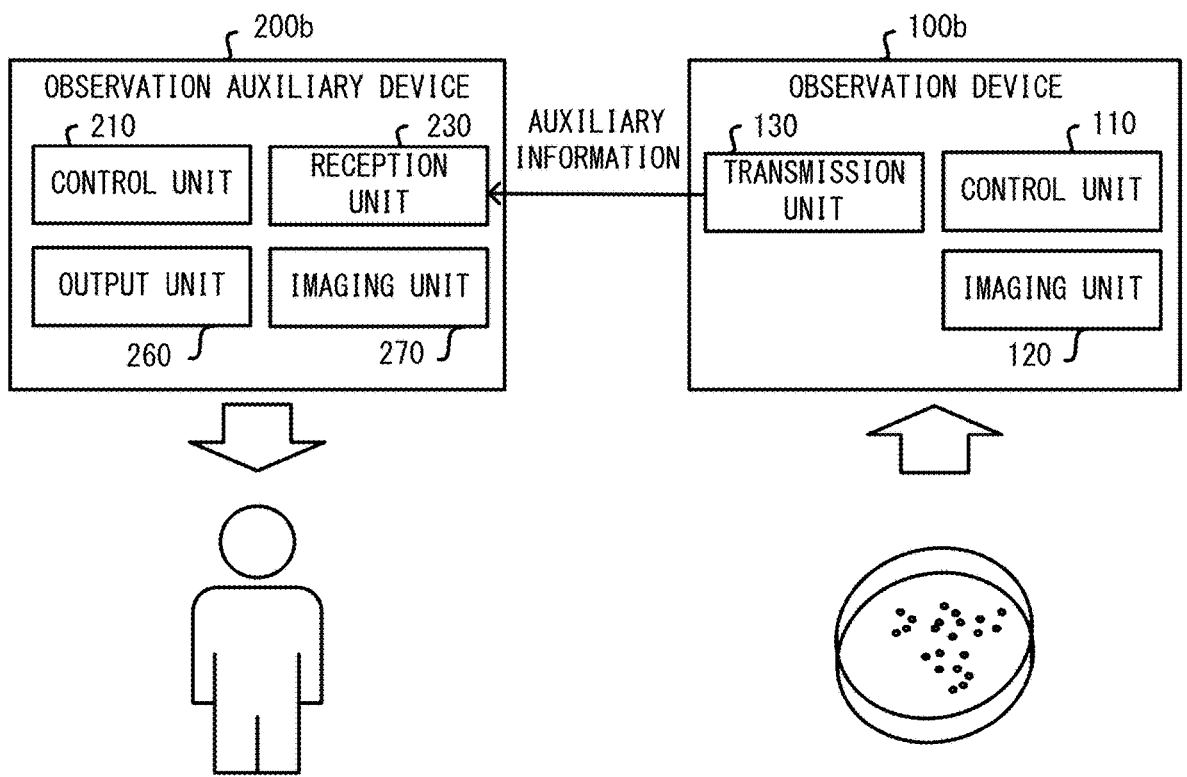
FIG. 15 is a diagram for explaining a functional configuration of a system according to a third embodiment.

FIG. 15 is a diagram for explaining a functional configuration of the system according to the present embodiment. As illustrated in FIG. 15, the system (hereinafter, simply referred to as the present system) according to the present embodiment includes an observation device 100b and an observation auxiliary device 200b capable of communicating with the observation device 100b.

The observation device 100b is different from the observation device 100 in that the transmitter unit 140 is not included. The observation auxiliary device 200b is different from the observation auxiliary device 200 in that the observation auxiliary device 200b includes an imaging unit 270 instead of the reception unit 240. The imaging unit 270, which is an imaging device that captures an image of the retina, captures an image of the retina of the user wearing the observation auxiliary device 200b, and the control unit 210 detects the relative position on the basis of the image captured by the imaging unit 270. In other words, the present system is different from the system 1000 in that the relative position is detected by the observation auxiliary device 200b alone.

Figure 16:
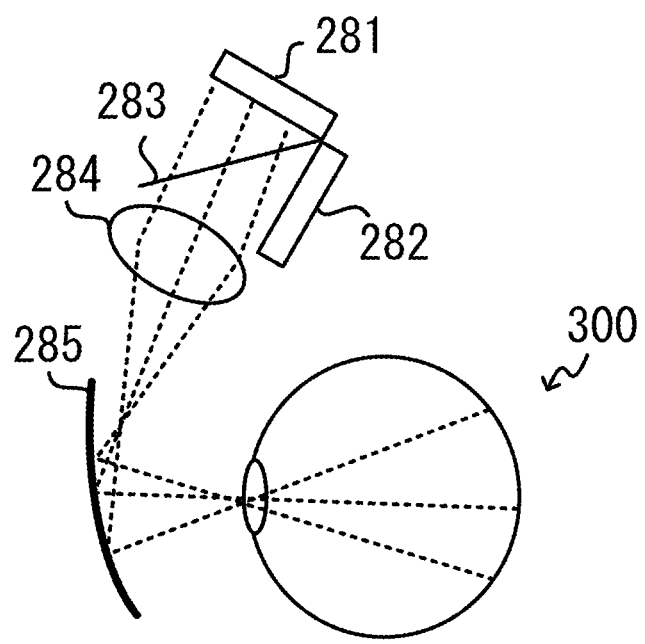
FIG. 16 is a diagram for explaining an example of configurations of an output unit 260 and an imaging unit 270.
Figure 17:
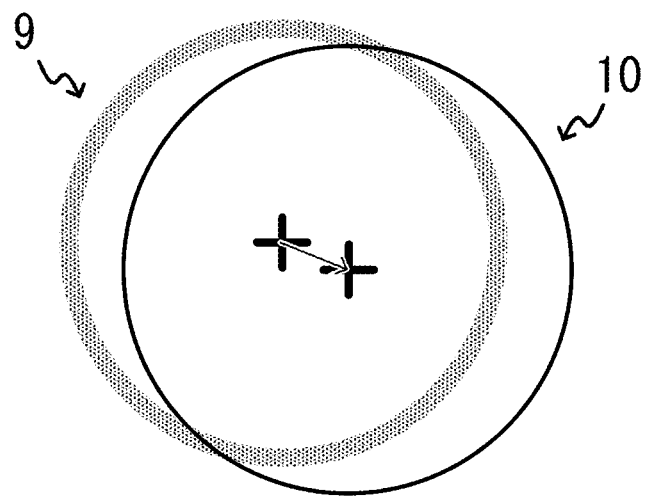
FIG. 17 is a diagram illustrating an example of an image captured by the imaging unit 270.

FIG. 16 is a diagram for explaining an example of configurations of an output unit 260 and the imaging unit 270. FIG. 17 is a diagram illustrating an example of an image captured by the imaging unit 270. In the example illustrated in FIG. 16, the output unit 260 is a retina projection device having the same configuration as the output unit 220 illustrated in FIG. 11 and projecting an image on the retina of the user. In other words, the output unit 260 includes the display element 281, the lens 284, and the concave mirror 285. Light from the display element 281 is incident on the eye 300 from the pupil through the lens 284 and the concave mirror 285, and an image of the display element 281 is projected on the retina.

The imaging unit 270 includes an imaging element 282, a half mirror 283, the lens 284, and the concave mirror 285. The light from the retina passes through the pupil and is incident on the half mirror 283 via the concave mirror 285 and the lens 284. Furthermore, the imaging element 282 is irradiated with the light reflected by the half mirror 283, whereby the image of the retina is projected on the imaging element 282.

When the imaging unit 270 captures an image of the retina, the output unit 260 projects an image for position detection on the retina. Specifically, for example, when the user approaches the eyepiece lens 102, the output unit 260 displays an annular ring having a size corresponding to the number of fields of view of the eyepiece lens 102 on the display element 281 and projects an image 10 for detecting the relative position on the retina. The output unit 260 preferably projects the image 10 for detecting the relative position on the retina with light outside the visible range by the display element 281 emitting light outside the visible range. As the light outside the visible range, for example, infrared light is preferably used. The imaging unit 270 captures an image of the retina during a period in which the image 10 for detecting the relative position is projected on the retina by the output unit 260. As a result, an image including the image 9 projected on the retina via the eyepiece lens 102 and the image 10 for detecting the relative position is captured by the imaging unit 270.

In the observation auxiliary device 200b, the control unit 210 detects the relative position on the basis of the image of the retina captured by the imaging unit 270 during the period in which the image 10 for detecting the relative position is projected on the retina by the output unit 260. More specifically, the relative position may be detected on the basis of the image 9 and the image 10 for detecting the relative position, and for example, the relative position may be detected by comparing center positions of the image 9 and the image 10 for detecting the relative position.

Effects similar to those of the system 1000 can be obtained by the present system. In addition, according to the present system, it is possible to minimize deformation with respect to the observation device 100 in related art.

Fourth Embodiment

Figure 18:
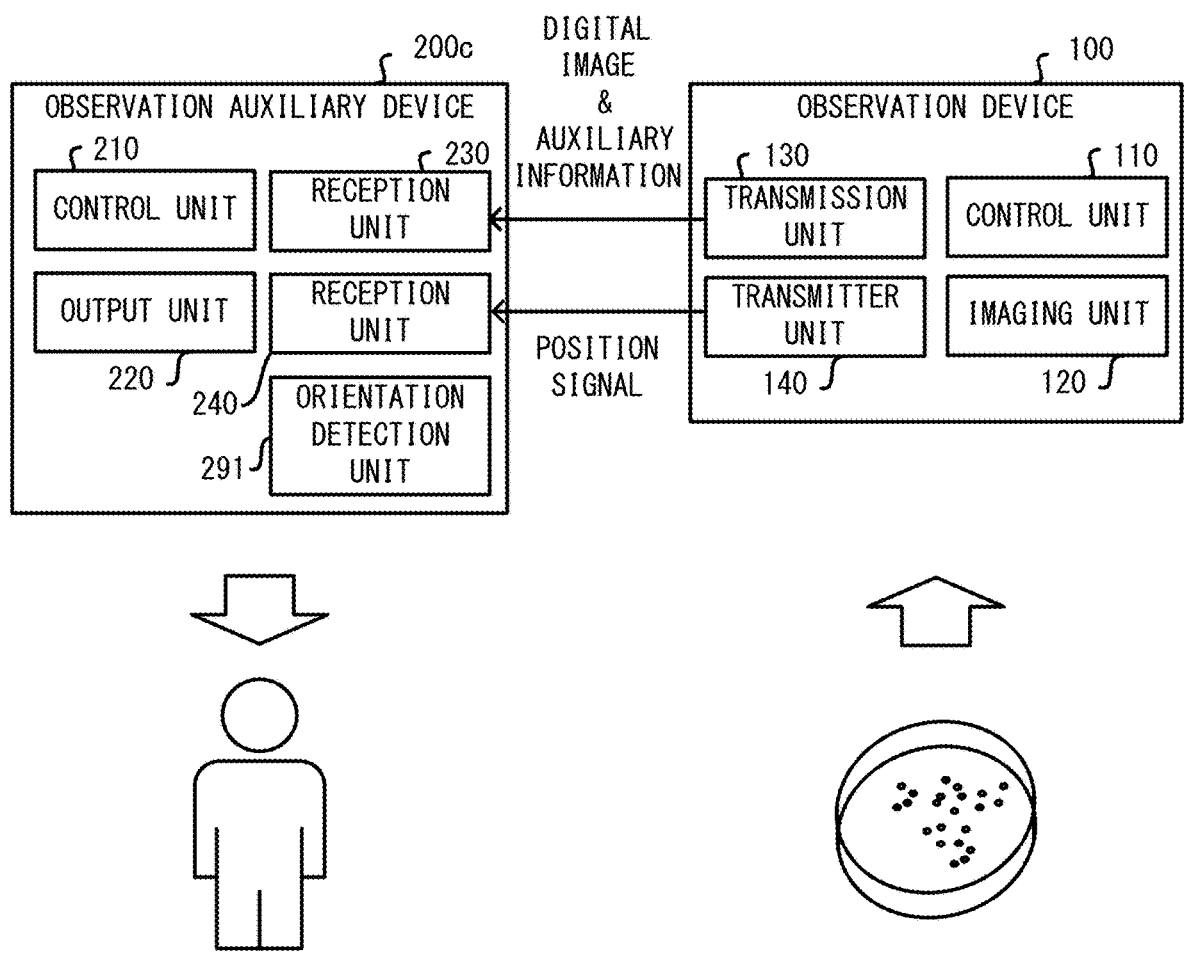
FIG. 18 is a diagram for explaining a functional configuration of a system according to a fourth embodiment.
Figure 19:
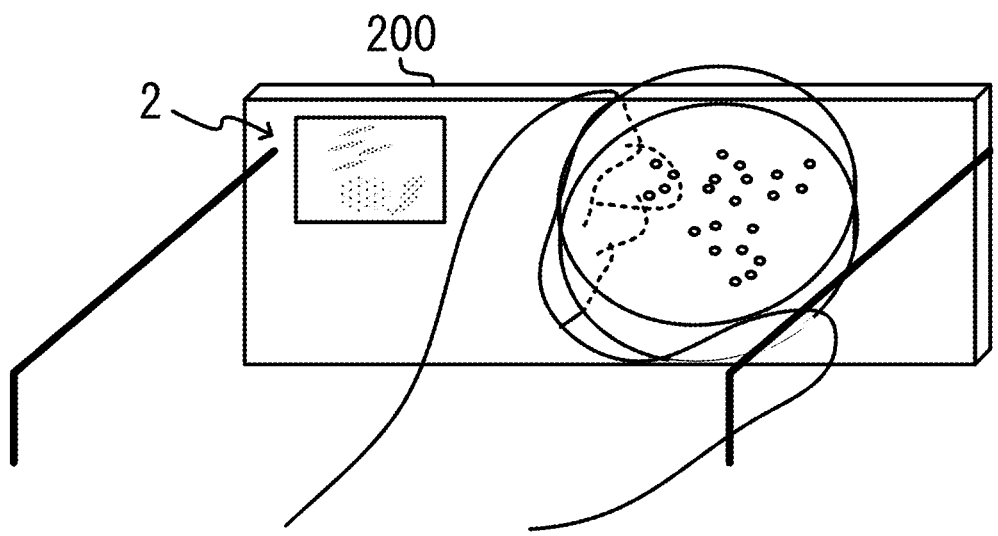
FIG. 19 is a diagram illustrating an output example of auxiliary information in an observation auxiliary device 200c.

FIG. 18 is a diagram for explaining a functional configuration of a system according to the present embodiment. FIG. 19 is a diagram illustrating an output example of auxiliary information in an observation auxiliary device 200c. As illustrated in FIG. 18, the system (hereinafter, simply referred to as the present system) according to the present embodiment includes the observation device 100 and an observation auxiliary device 200c capable of communicating with the observation device 100. Note that in the observation device 100, the transmission unit 130 transmits a digital image together with the auxiliary information to the observation auxiliary device 200c.

The observation auxiliary device 200c is different from the observation auxiliary device 200 in that the observation auxiliary device 200c includes an orientation detection unit 291. The orientation detection unit 291 includes a sensor that detects an orientation of the observation auxiliary device 200c. The observation auxiliary device 200c outputs the digital image captured by the observation device 100 as the auxiliary information when the relative position and the orientation detected by the orientation detection unit 291 satisfy a predetermined condition. As a result, it is possible to support work of setting the sample on the stage by the user.

The predetermined condition may be, for example, a condition that a distance between the observation device 100 and the observation auxiliary device 200 is equal to or longer than a predetermined distance (third distance) and less than a predetermined distance (fourth distance (>third distance)), and the detected orientation is a predetermined orientation (for example, obliquely downward, and the like). The predetermined condition may be any condition to be satisfied when the user sets the sample (container) on the stage.

As a result, as illustrated in FIG. 19, the user can confirm the digital image 2 while setting the sample on the stage, so that the user can place the sample at an appropriate position on the stage without looking into the eyepiece lens 102. The third distance may be the same as the first distance illustrated in FIG. 8.

Fifth Embodiment

Figure 20:
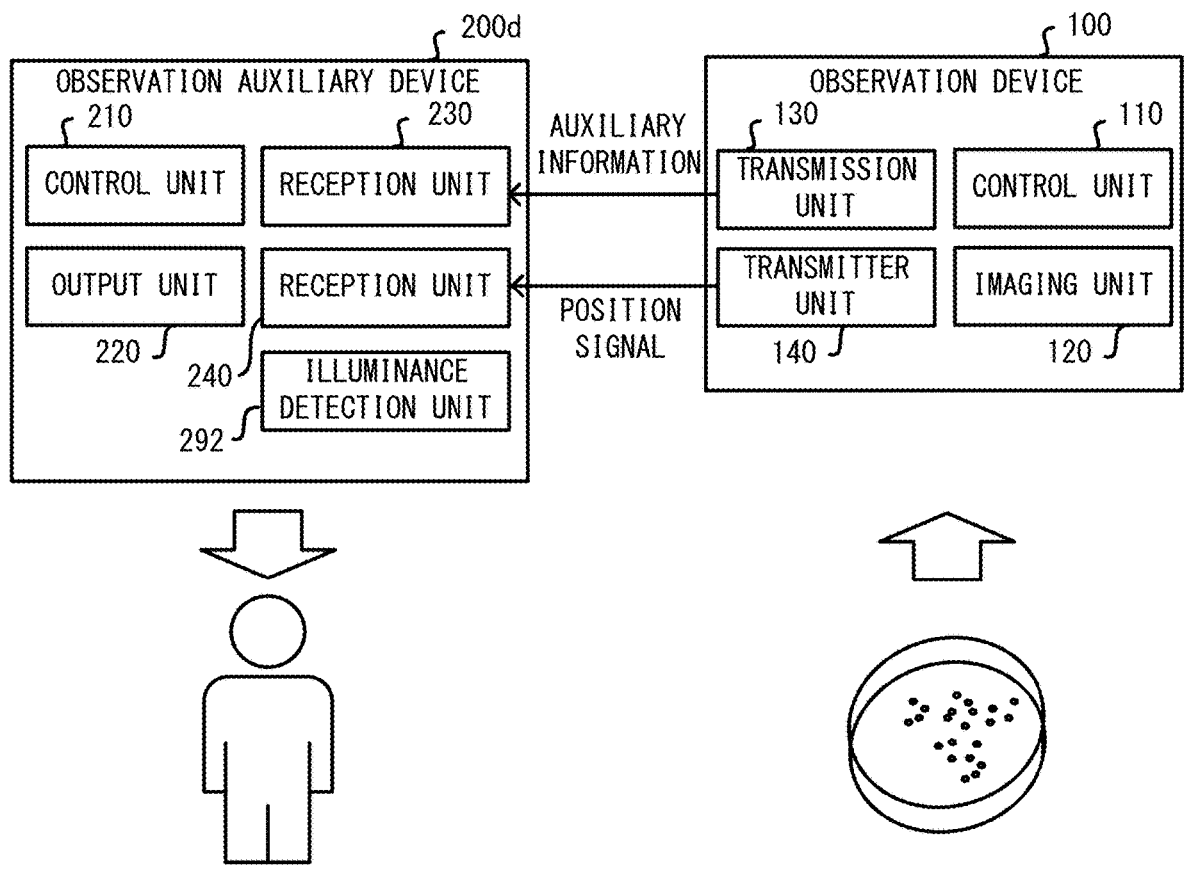
FIG. 20 is a diagram for explaining a functional configuration of a system according to a fifth embodiment.
Figure 21:
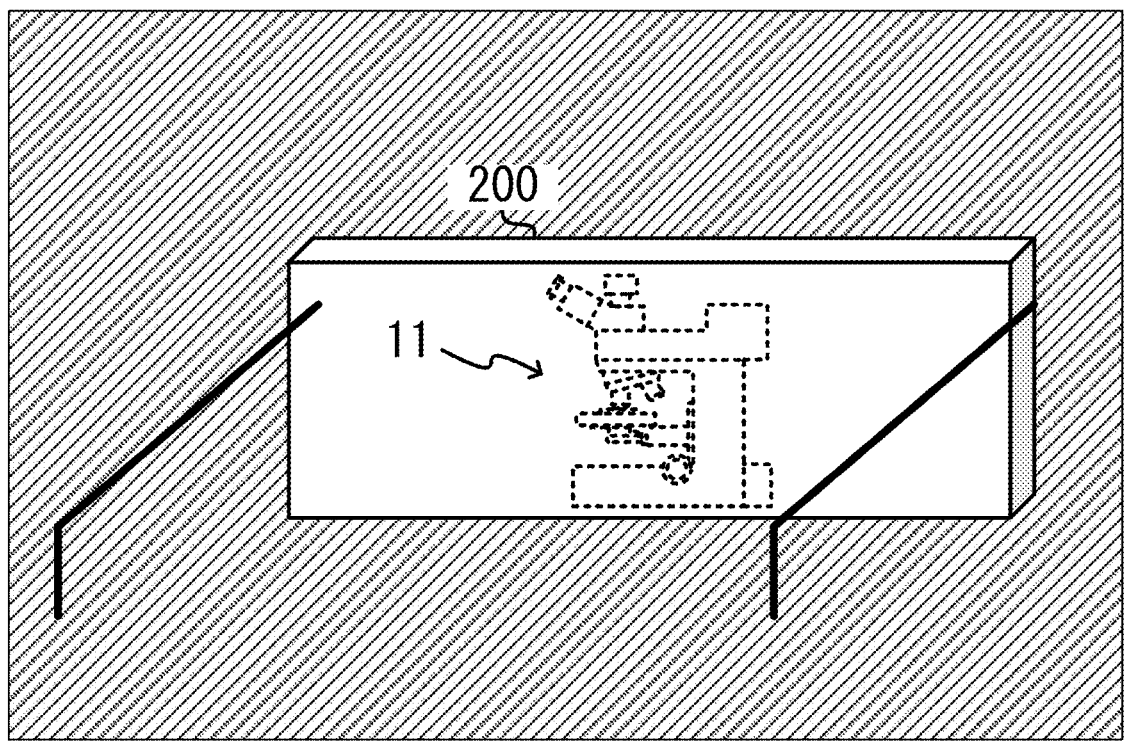
FIG. 21 is a diagram illustrating an output example of auxiliary information in an observation auxiliary device 200d.

FIG. 20 is a diagram for explaining a functional configuration of a system according to the present embodiment. FIG. 21 is a diagram illustrating an output example of auxiliary information in an observation auxiliary device 200d. As illustrated in FIG. 20, the system (hereinafter, simply referred to as the present system) according to the present embodiment includes the observation device 100 and an observation auxiliary device 200d capable of communicating with the observation device 100.

The observation auxiliary device 200d is different from the observation auxiliary device 200 in that the observation auxiliary device 200d includes an illuminance detection unit 292. The illuminance detection unit 292 includes an illuminance sensor that detects brightness around the observation auxiliary device 200. As illustrated in FIG. 21, when the relative position satisfies a predetermined condition, the observation auxiliary device 200d outputs an image (wire frame 11) indicating the position of the observation device 100 as an auxiliary image. More preferably, the observation auxiliary device 200d outputs an image indicating the position of the observation device 100 as an auxiliary image when the relative position and the illuminance detected by the illuminance detection unit 292 satisfy a predetermined condition.

The predetermined condition may be, for example, a condition that a distance between the observation device 100 and the observation auxiliary device 200 is equal to or longer than a predetermined distance (third distance) and less than a predetermined distance (fourth distance (>third distance)). Further, the predetermined condition may be a condition that the distance between the observation device 100 and the observation auxiliary device 200 is equal to or longer than the predetermined distance (third distance) and less than the predetermined distance (fourth distance (>third distance)), and the detected illuminance is less than a predetermined value. The predetermined condition may be a condition to be satisfied when the user approaches the observation device 100 to some extent, and more preferably, may be a condition to be satisfied when the user approaches the observation device 100 to some extent in a dark environment.

As a result, the wire frame 11 of the observation device 100 is displayed as illustrated in FIG. 21, the user can grasp the position of the observation device 100 through the observation auxiliary device 200 even in a case where the user observes the sample in a dark room. The user can therefore smoothly perform the observation work in the dark room. The third distance may be the same as the first distance illustrated in FIG. 8.

The above embodiments are specific examples for facilitating understanding of the invention, and the present invention is not limited to these embodiments. Modifications obtained by modifying the above embodiments and alternative forms replacing the above embodiments can be included. In other words, in each embodiment, the components can be modified without departing from the spirit and the scope thereof. Further, a new embodiment can be implemented by appropriately combining the multiple components disclosed in one or more of the embodiments. Further, some components may be omitted from the components described in the corresponding embodiment, or some components may be added to the components described in the embodiment. Further, the order of the processing procedures in each embodiment is interchangeable as long as there is no contradiction. In other words, the observation system of the present invention and the observation support method can be variously modified and changed without departing from the scope of the invention defined by the claims.

Figure 22:
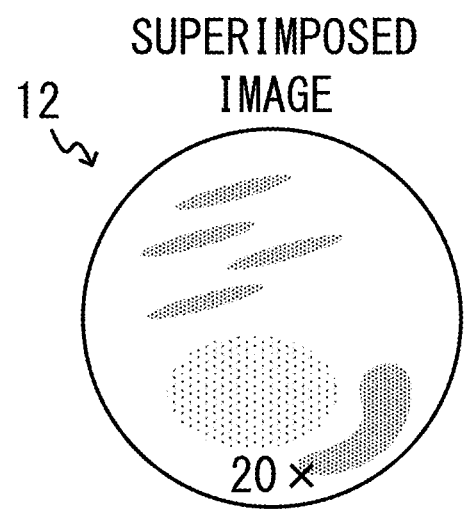
FIG. 22 is a diagram illustrating another example of the superimposed image.
Figure 23:
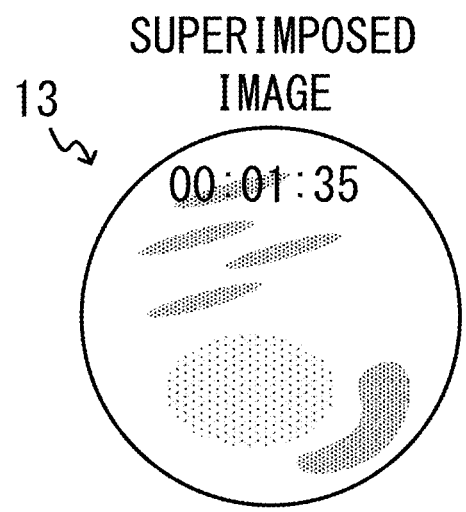
FIG. 23 is a diagram illustrating still another example of the superimposed image.

While in the above-described embodiment, for example, FIG. 2 illustrates an example where the auxiliary information 3 is generated on the basis of the digital image 2 acquired by the observation device, the auxiliary information does not necessarily have to be generated on the basis of the digital image. The auxiliary information may be, for example, information regarding setting of the observation device 100 such as the magnification of the objective 101, and the user may observe the superimposed image 12 in which the auxiliary information "20×" indicating the magnification of the objective 101 is superimposed on the optical image as illustrated in FIG. 22. Further, the auxiliary information is not limited to the information acquired from the observation device as illustrated in FIG. 22. The auxiliary information may be, for example, information regarding time such as an elapsed time from a predetermined time or a remaining time up to a predetermined time, and the user may observe the superimposed image 13 in which auxiliary information "00:01:35" indicating time is superimposed on the optical image as illustrated in FIG. 23.

In the above-described embodiment, FIG. 10 illustrates the configuration in which the observation device 100 includes the transmitter unit 140 and the observation auxiliary device 200 includes the reception unit 240, and FIG. 14 illustrates the configuration in which the observation device 100a includes the reception unit 150 and the observation auxiliary device 200 includes the transmitter unit 250. In other words, in the system, one of the observation device and the observation auxiliary device may include a transmitter unit that transmits a signal for detecting the relative position, and the other may include a reception unit that receives the signal for detecting the relative position.

While in the above-described embodiment, the smart glasses, the see-through type head mounted display, and the smart contact lens have been exemplified as specific examples of the observation auxiliary device, in a case where the smart glasses or the see-through type head mounted display is used as the observation auxiliary device, if the eye relief is shorter than a case where the user looks into the eyepiece lens 102 with the naked eye, the observation auxiliary device interferes and the eye cannot be placed at the eye point in some cases. It is therefore preferable that the observation device includes a so-called high-eye point eyepiece lens 102, and for example, it is preferable that the observation device has an eye relief of equal to or longer than 40 mm Herein, expression of "on the basis of A" does not indicate "on the basis of only A", but indicates "on the basis of at least A". In other words, "on the basis of A" may be on the basis of B in addition to A.

What is claimed is:

1. An observation system comprising:
    an observation device that includes an eyepiece lens and an objective and that forms a real image of a sample on an optical path between the eyepiece lens and the objective; and
    an observation auxiliary device that is configured to be worn by a user and to output auxiliary information to the user, the observation auxiliary device superimposing the auxiliary information on a virtual image of the sample observed by the user via the eyepiece lens based on a relative position between the observation auxiliary device and the observation device,
    wherein each of the real image and the virtual image is an optical live view image.

2. The observation system according to claim 1, wherein the observation auxiliary device changes an output position of the auxiliary information based on a distance and a direction from an optical axis of the eyepiece lens to the observation auxiliary device.

3. The observation system according to claim 2, wherein:
    one of the observation device and the observation auxiliary device includes a transmitter that transmits a signal for detecting the relative position, and
    the other of the observation device and the observation auxiliary device includes a receiver that receives the signal for detecting the relative position.

4. The observation system according to claim 2, wherein:
    the observation auxiliary device includes:
        a retina projection device that projects, on a retina of the user, an image for detecting the relative position; and
        an imaging device that captures an image of the retina, and the observation auxiliary device detects the relative position based on the image of the retina captured by the imaging device during a period in which the retina projection device projects the image for detecting the relative position on the retina.

5. The observation system according to claim 1, wherein the observation auxiliary device stops output of the auxiliary information based on a distance from the observation device to the observation auxiliary device.

6. The observation system according to claim 1, wherein:
one of the observation device and the observation auxiliary device includes a transmitter that transmits a signal for detecting the relative position, and
the other of the observation device and the observation auxiliary device includes a receiver that receives the signal for detecting the relative position.

7. The observation system according to claim 6, wherein the signal includes at least one of an electromagnetic wave outside a visible range or an ultrasonic wave.

8. The observation system according to claim 6, wherein the observation device and the observation auxiliary device detect the relative position by three-point positioning.

9. The observation system according to claim 1, wherein:
the observation auxiliary device includes:
a retina projection device that projects, on a retina of the user, an image for detecting the relative position; and
an imaging device that captures an image of the retina, and
the observation auxiliary device detects the relative position based on the image of the retina captured by the imaging device during a period in which the retina projection device projects the image for detecting the relative position on the retina.

10. The observation system according to claim 9, wherein the observation auxiliary device detects the relative position based on the image for detecting the relative position projected on the retina and an image of the sample projected on the retina, each of which is included in the image of the retina.

11. The observation system according to claim 9, wherein the retina projection device projects the image for detecting the relative position on the retina with light outside a visible range.

12. The observation system according to claim 11, wherein the light outside the visible range is infrared light.

13. The observation system according to claim 1, wherein the observation auxiliary device includes at least one of smart glasses, a see-through type head mounted display, or a smart contact lens.

14. The observation system according to claim 1, wherein the observation auxiliary device includes a device using at least one of a retinal projection method, a retinal scanning method, a hologram method, or a micro LED method.

15. The observation system according to claim 1, wherein:
the observation auxiliary device further includes a sensor that detects an orientation of the observation auxiliary device, and
the observation auxiliary device outputs an image of the sample captured by the observation device as the auxiliary information when the relative position and the orientation detected by the sensor satisfy a predetermined condition.

16. The observation system according to claim 1, wherein the observation auxiliary device outputs an image indicating a position of the observation device as the auxiliary information when the relative position satisfies a predetermined condition.

17. The observation system according to claim 1, wherein the observation device has an eye relief of at least 40 mm.

18. The observation system according to claim 1, wherein:
the relative position between the observation auxiliary device and the observation device is variable, and
the user is an observer.

19. The observation system according to claim 1, wherein the observation device is a microscope device.

20. An observation support method comprising:
by an observation device including an eyepiece lens and an objective, forming a real image of a sample on an optical path between the eyepiece lens and the objective; and
by an observation auxiliary device worn by a user, outputting auxiliary information to the user and superimposing the auxiliary information on a virtual image of the sample observed by the user through the eyepiece lens based on a relative position between the observation auxiliary device and the observation device,
wherein each of the real image and the virtual image is an optical live view image.

21. An observation auxiliary device configured to be worn by an observer and to output auxiliary information to the observer, wherein the observation auxiliary device superimposes the auxiliary information on a virtual image based on a relative position between the observation auxiliary device and an observation device that forms a real image on an optical path between an eyepiece lens and an objective of the observation device, the virtual image being an optical live view image of a sample observed by the observer via the eyepiece lens, and the real image being an optical live view image of the sample.

* * * * *